(12) United States Patent
Shih et al.

(10) Patent No.: US 7,894,194 B2
(45) Date of Patent: Feb. 22, 2011

(54) RACK-MOUNTED FOLDABLE COMPUTER CONSOLE FOR KVM SWITCH

(75) Inventors: You-Lin Shih, Sindian (TW); Chun-Yin Chen, Sindian (TW)

(73) Assignee: Aten International Co., Ltd. (TW)

( * ) Notice: Subject to any disclaimer, the term of this patent is extended or adjusted under 35 U.S.C. 154(b) by 306 days.

(21) Appl. No.: 12/020,500

(22) Filed: Jan. 25, 2008

(65) Prior Publication Data
US 2009/0190293 A1   Jul. 30, 2009

(51) Int. Cl.
*H05K 5/00* (2006.01)
(52) U.S. Cl. ............. 361/725; 361/679.41; 361/679.43; 361/724; 361/726
(58) Field of Classification Search ............ 361/679.11, 361/679.12, 679.21
See application file for complete search history.

(56) References Cited

U.S. PATENT DOCUMENTS

| 3,320,488 | A  | * | 5/1967  | Karew et al. ................. 361/724 |
| 5,388,032 | A  | * | 2/1995  | Gill et al. ....................... 700/17 |
| 6,185,092 | B1 | * | 2/2001  | Landrum et al. ........ 361/679.11 |
| 6,201,690 | B1 | * | 3/2001  | Moore et al. ........... 361/679.21 |
| 6,340,212 | B1 | * | 1/2002  | Beiss et al. ............... 312/223.3 |
| 6,353,532 | B1 | * | 3/2002  | Landrum et al. ......... 312/223.2 |
| 6,386,120 | B1 | * | 5/2002  | Nelson et al. ................. 108/134 |
| 6,563,700 | B1 | * | 5/2003  | Waller et al. ........... 361/679.09 |
| 6,609,034 | B1 | * | 8/2003  | Behrens et al. ............... 700/19 |
| 6,842,334 | B2 | * | 1/2005  | Smith et al. ............ 361/679.02 |
| 6,865,075 | B2 | * | 3/2005  | Oakley .................... 361/679.1 |
| 6,945,412 | B2 | * | 9/2005  | Felcman et al. ................ 211/26 |
| 6,961,246 | B2 | * | 11/2005 | Dickey et al. ................ 361/724 |
| 7,271,998 | B2 | * | 9/2007  | Tanaka et al. .......... 361/679.55 |
| 7,405,926 | B2 | * | 7/2008  | Wu et al. ................ 361/679.27 |
| 7,505,255 | B2 | * | 3/2009  | Wu ......................... 361/679.27 |
| 7,513,579 | B2 | * | 4/2009  | Nay et al. ................. 312/208.1 |
| 7,524,004 | B2 | * | 4/2009  | Nakamura et al. ........ 312/223.2 |
| 7,527,155 | B2 | * | 5/2009  | McClain et al. ................ 211/26 |
| 7,568,663 | B2 | * | 8/2009  | Takagi et al. ................ 248/27.1 |
| 7,624,281 | B2 | * | 11/2009 | Mehta et al. ................. 713/186 |

(Continued)

FOREIGN PATENT DOCUMENTS

CN         101025644 A      8/2007

(Continued)

OTHER PUBLICATIONS

Chinese Office Action, dated Mar. 16, 2010, in a counterpart Chinese patent application, No. 200810213366.1. Concise Explanation of Relevance: the Chinese Office Action rejects claims in the Chinese application in view of Foreign Patent Document Nos. 1-2 above.

*Primary Examiner*—Jayprakash N Gandhi
*Assistant Examiner*—Anthony Q Edwards
(74) *Attorney, Agent, or Firm*—Chen Yoshimura LLP

(57) ABSTRACT

A rack-mounted, combined KVM switch with console is described. The combined KVM switch with console is attached to the rack by affixing the switch to two front posts of the rack. The monitor and input module of the console are hinged to the switch so that they can be independently swiveled. The user may easily position the monitor and the input module in various different positions for various purposes. A first locking mechanism releasably locks the input module to a horizontal position, and a second locking mechanism releasably locks the monitor to a vertical position.

20 Claims, 15 Drawing Sheets

U.S. PATENT DOCUMENTS

| | | | | |
|---|---|---|---|---|
| 2005/0168499 A1* | 8/2005 | Williams et al. | | 345/905 |
| 2005/0173357 A1* | 8/2005 | McClain et al. | | 211/26 |
| 2006/0117085 A1* | 6/2006 | Nagao et al. | | 709/203 |
| 2006/0220505 A1* | 10/2006 | Nakamura et al. | | 312/223.2 |
| 2006/0244700 A1* | 11/2006 | Sano et al. | | 345/87 |
| 2007/0083619 A1* | 4/2007 | Chen et al. | | 709/218 |
| 2007/0165391 A1* | 7/2007 | Charna et al. | | 361/807 |
| 2007/0195496 A1* | 8/2007 | Wu et al. | | 361/683 |
| 2007/0204079 A1* | 8/2007 | Wu | | 710/62 |
| 2007/0230095 A1* | 10/2007 | Wu | | 361/679 |
| 2008/0068788 A1* | 3/2008 | Ozawa et al. | | 361/686 |
| 2008/0102708 A1* | 5/2008 | Wu | | 439/652 |
| 2008/0204982 A1* | 8/2008 | Wu et al. | | 361/680 |
| 2009/0222670 A1* | 9/2009 | Mehta et al. | | 713/186 |

FOREIGN PATENT DOCUMENTS

| | | |
|---|---|---|
| CN | 101071331 A | 11/2007 |
| TW | 200701858 A | 1/2007 |

* cited by examiner

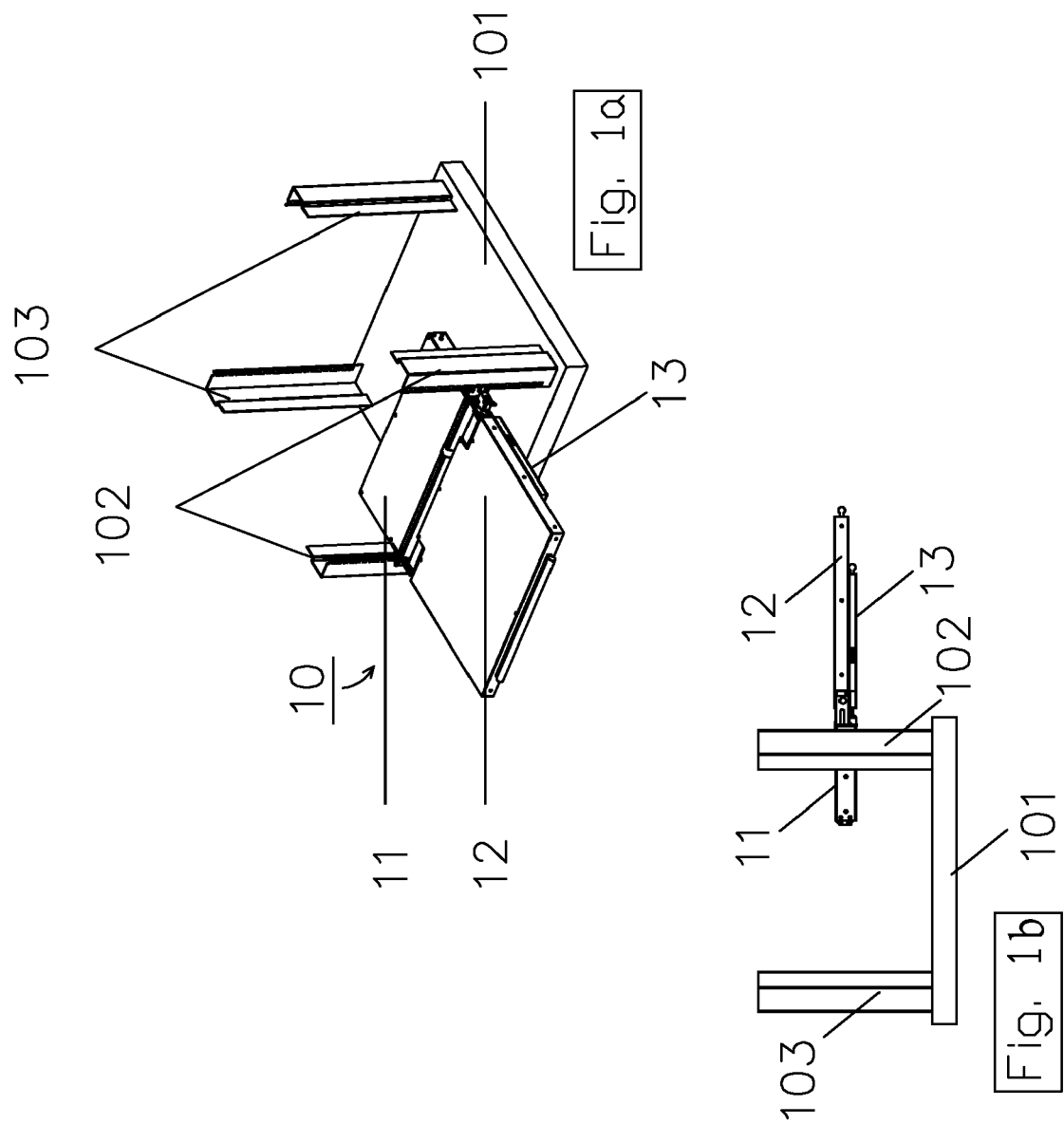

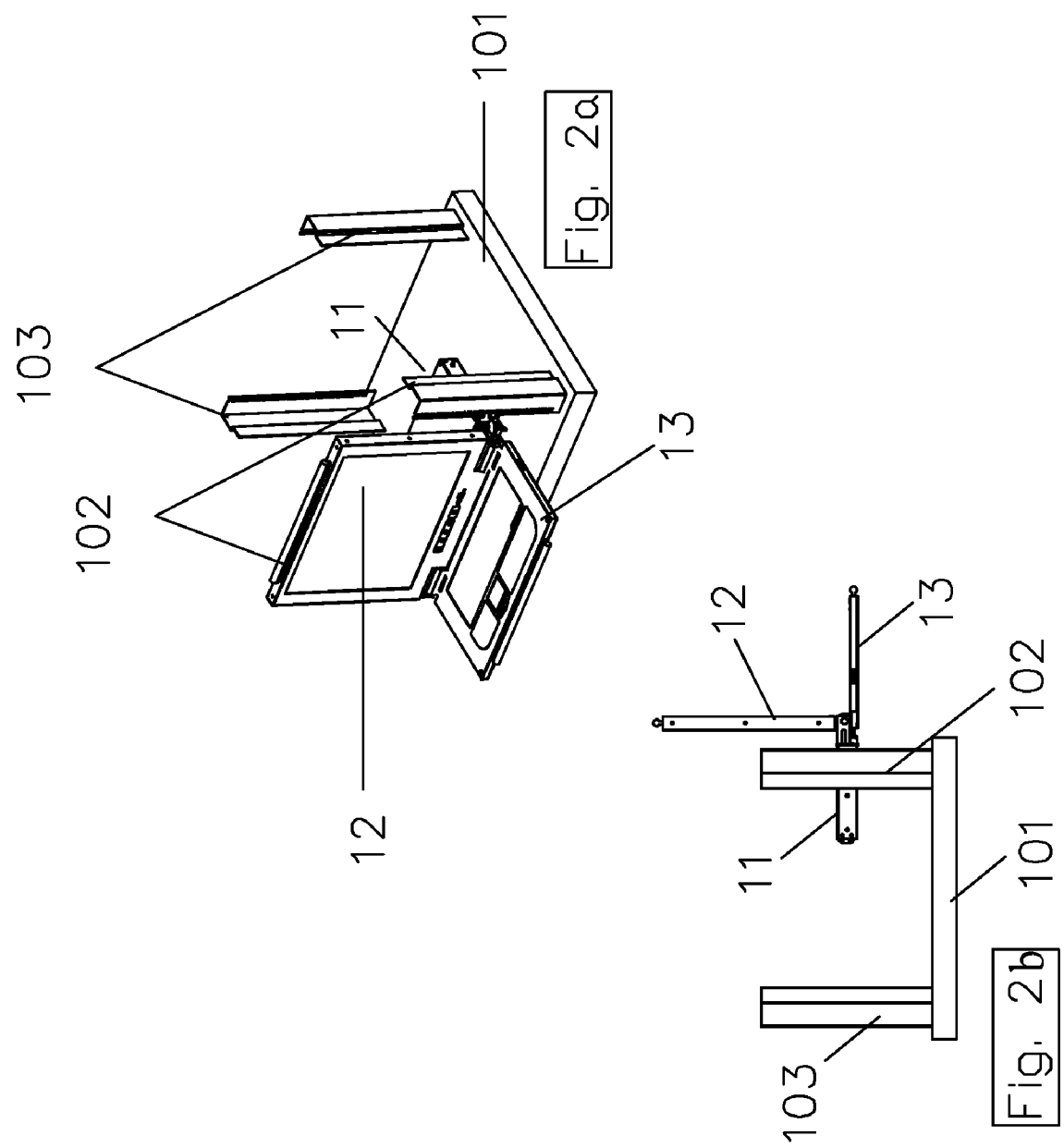

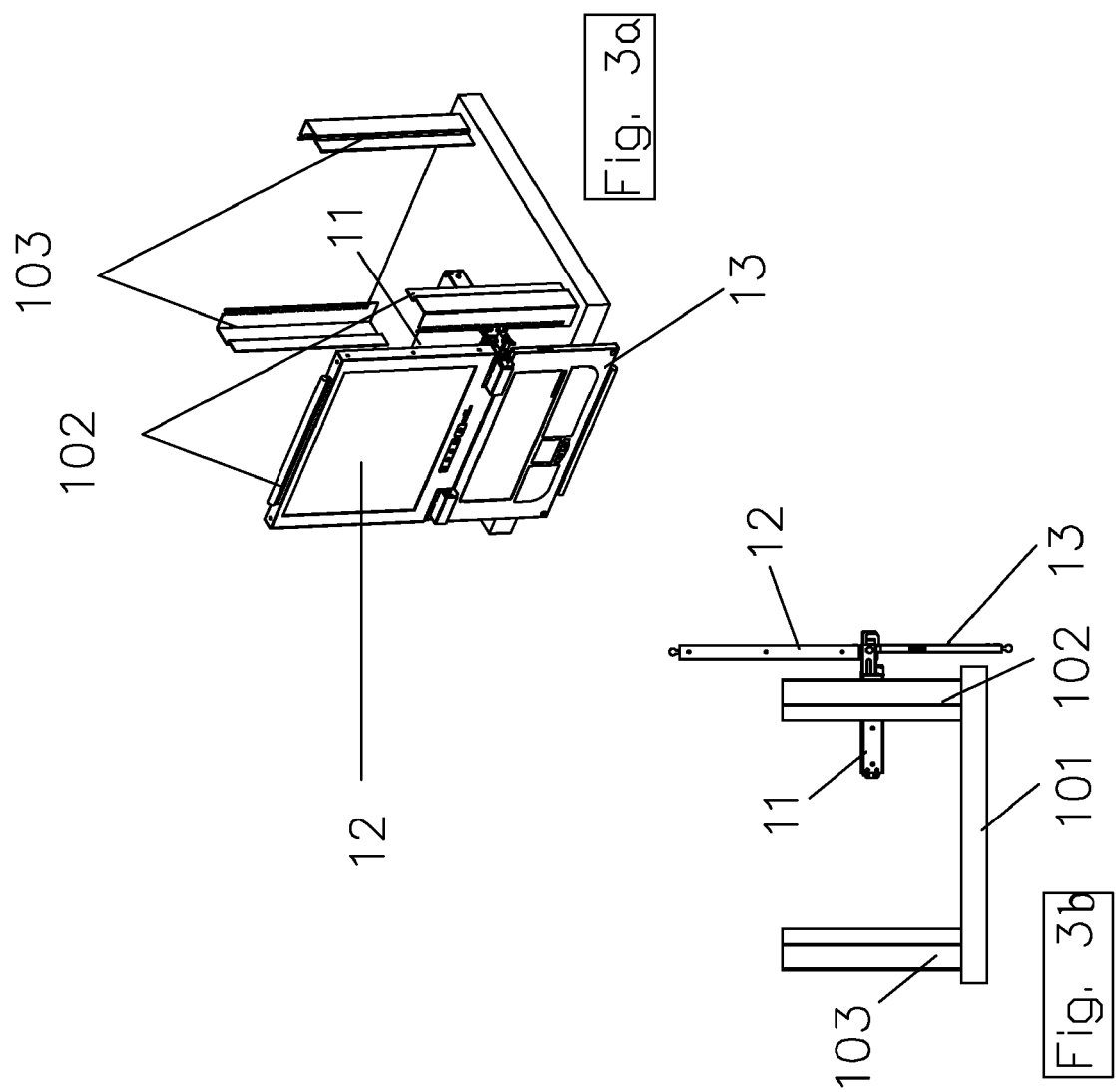

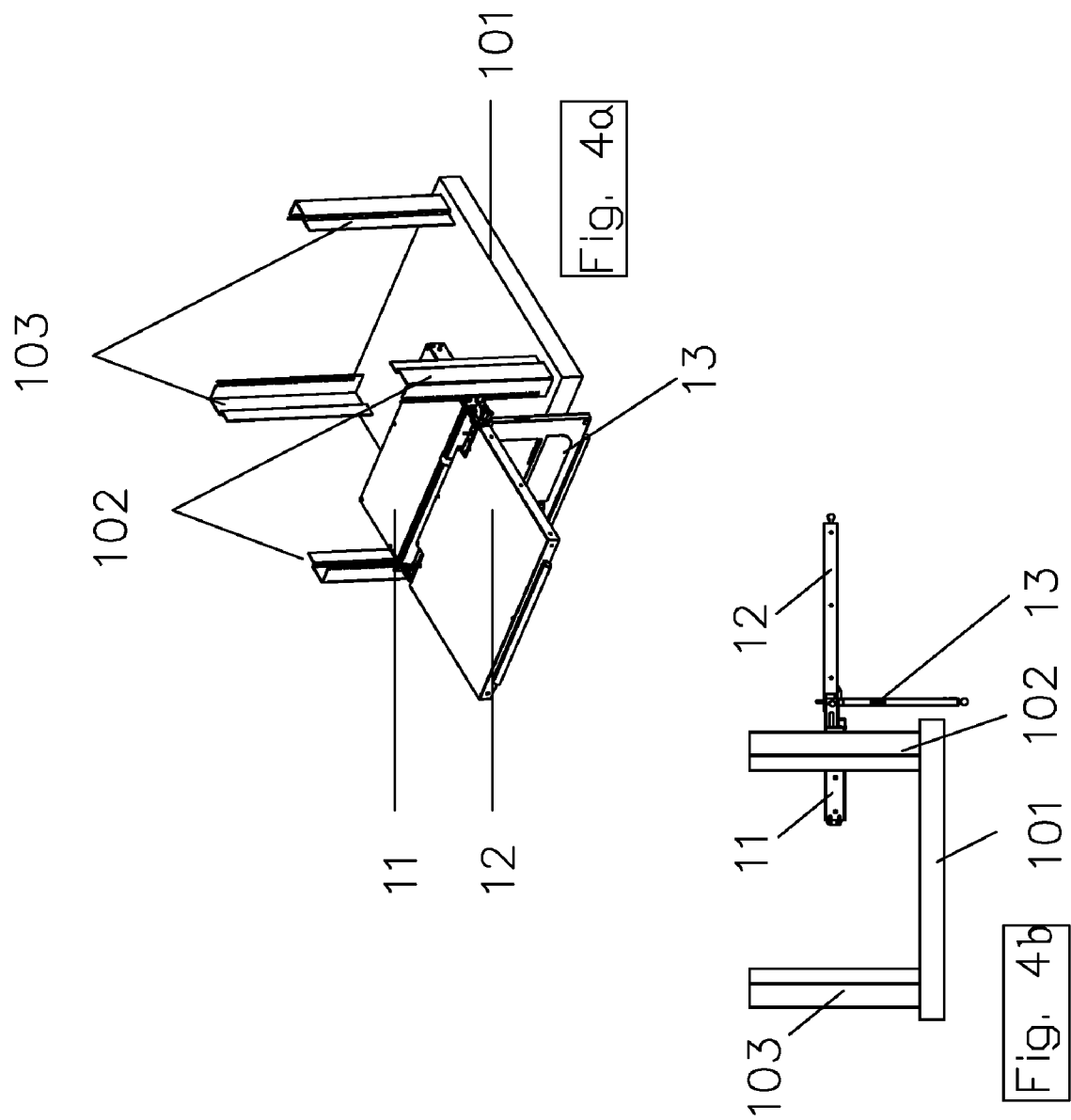

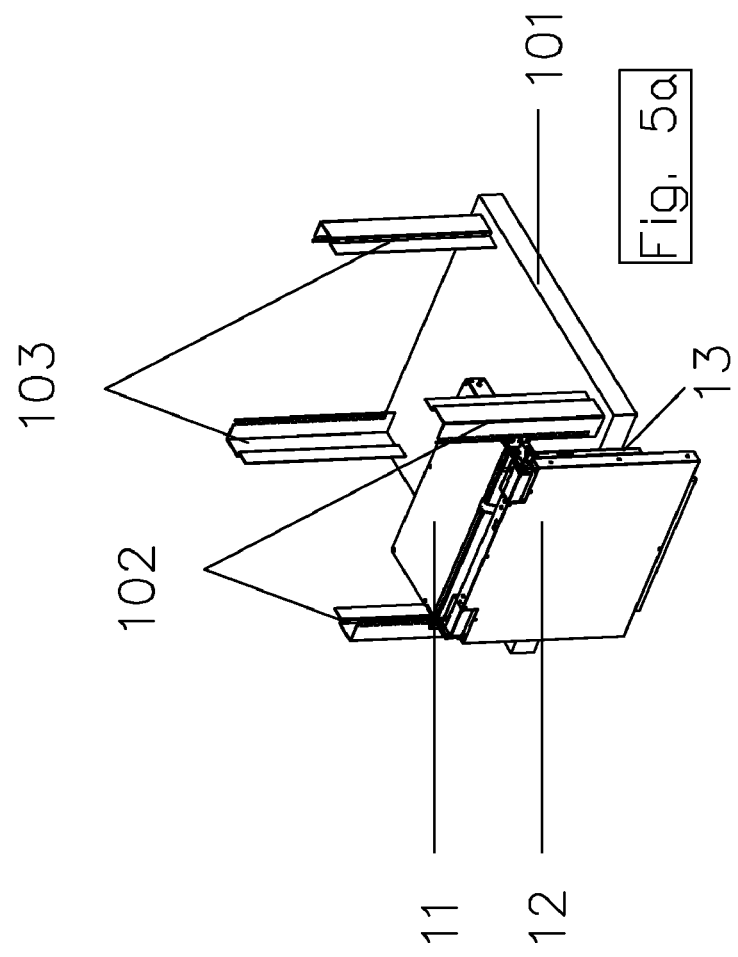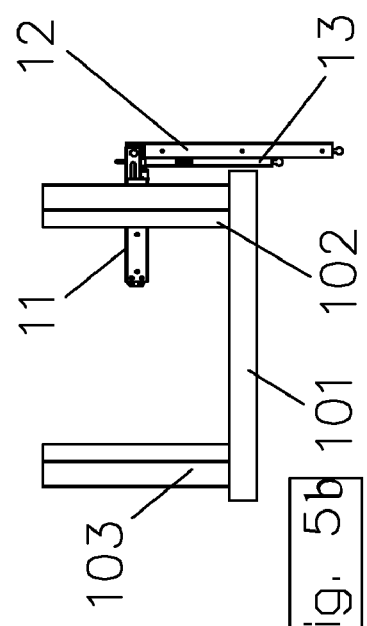

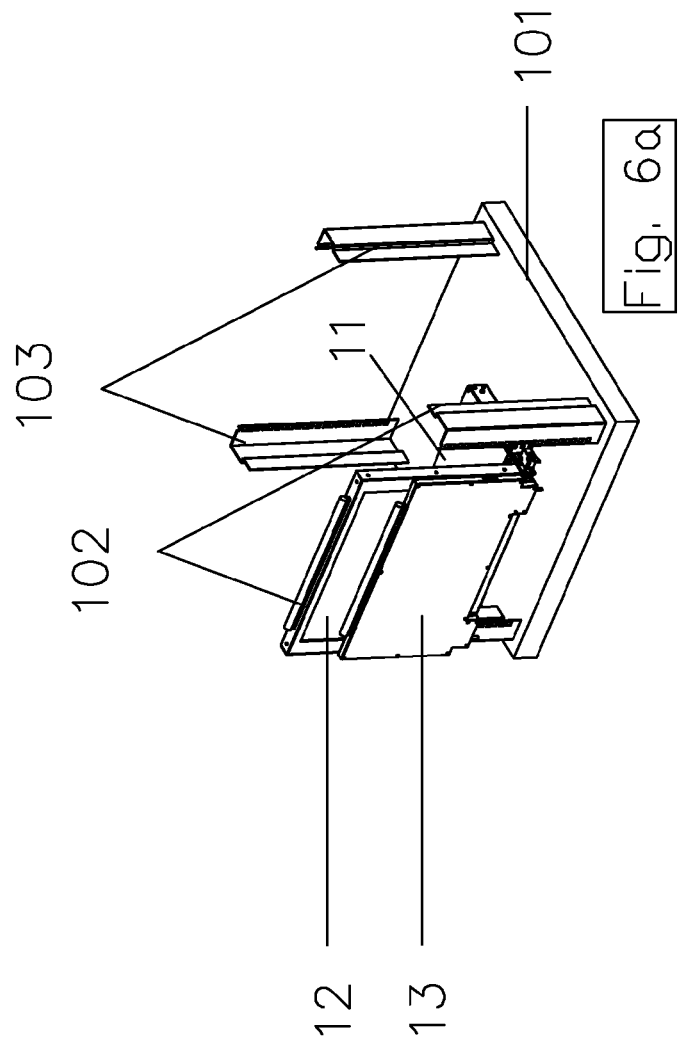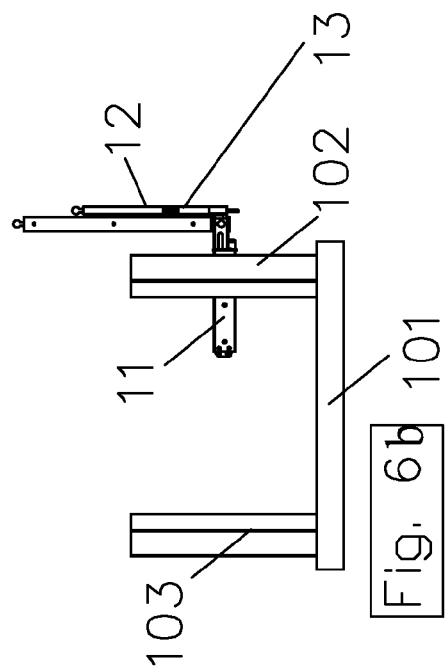

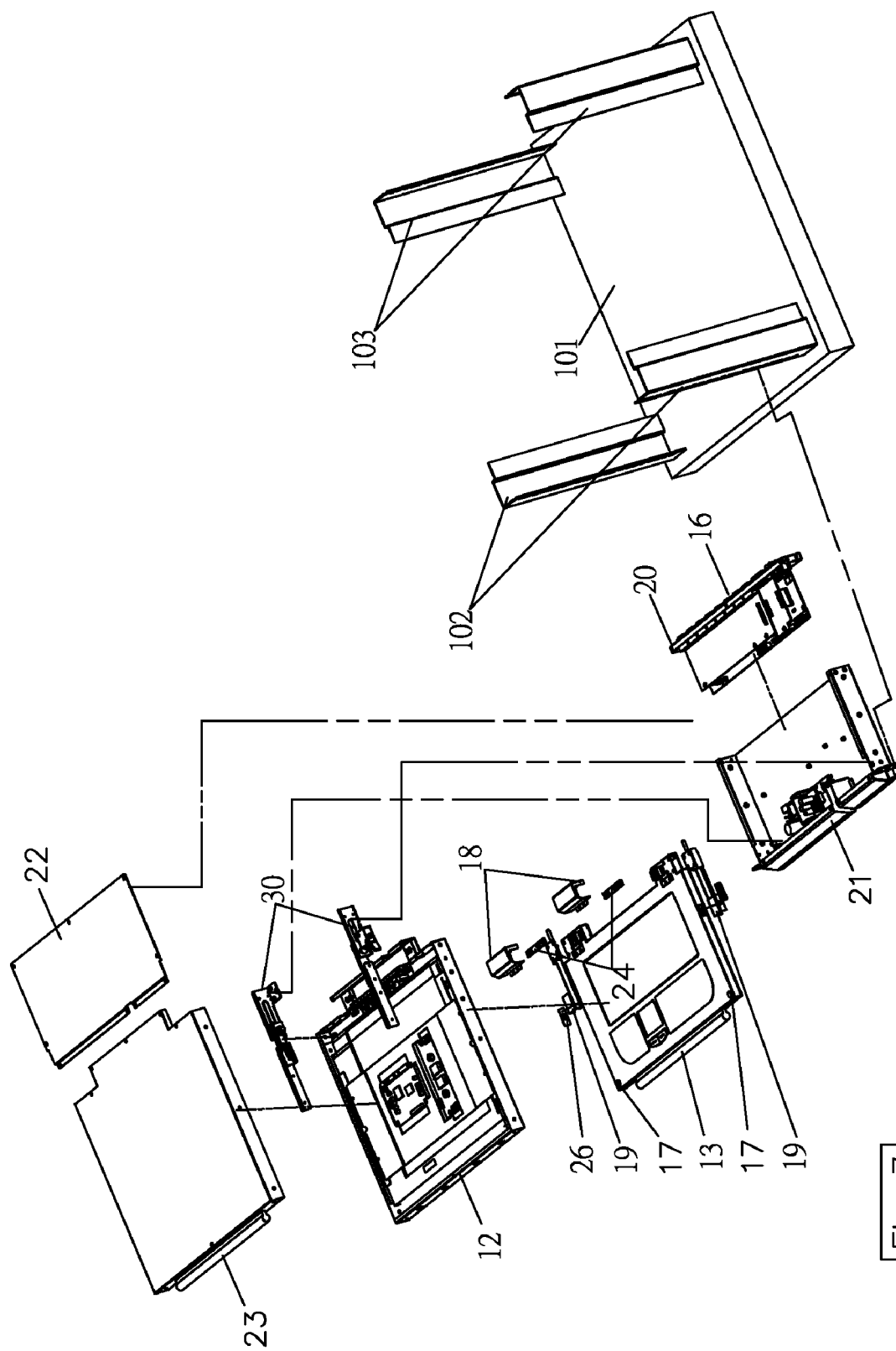

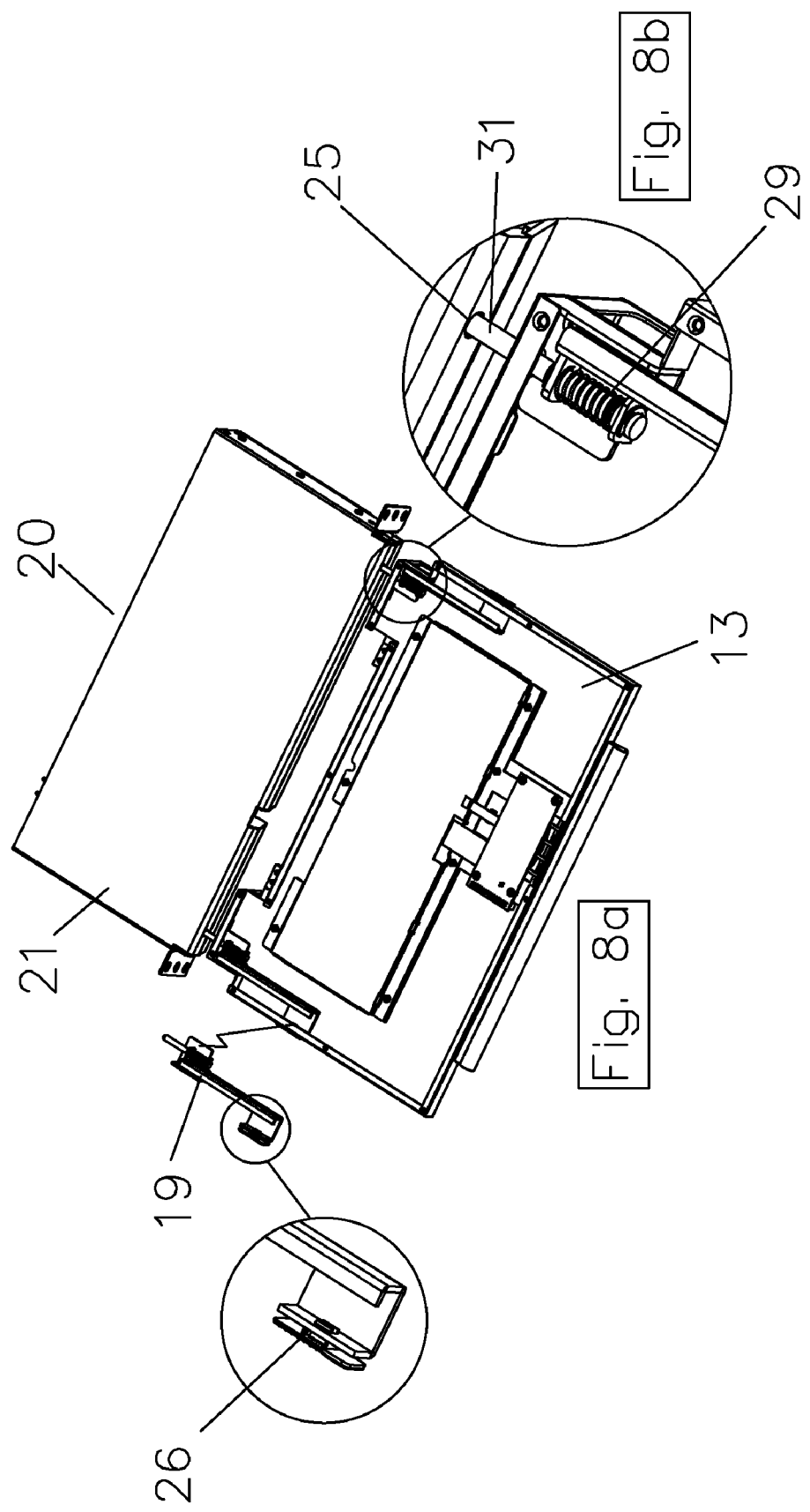

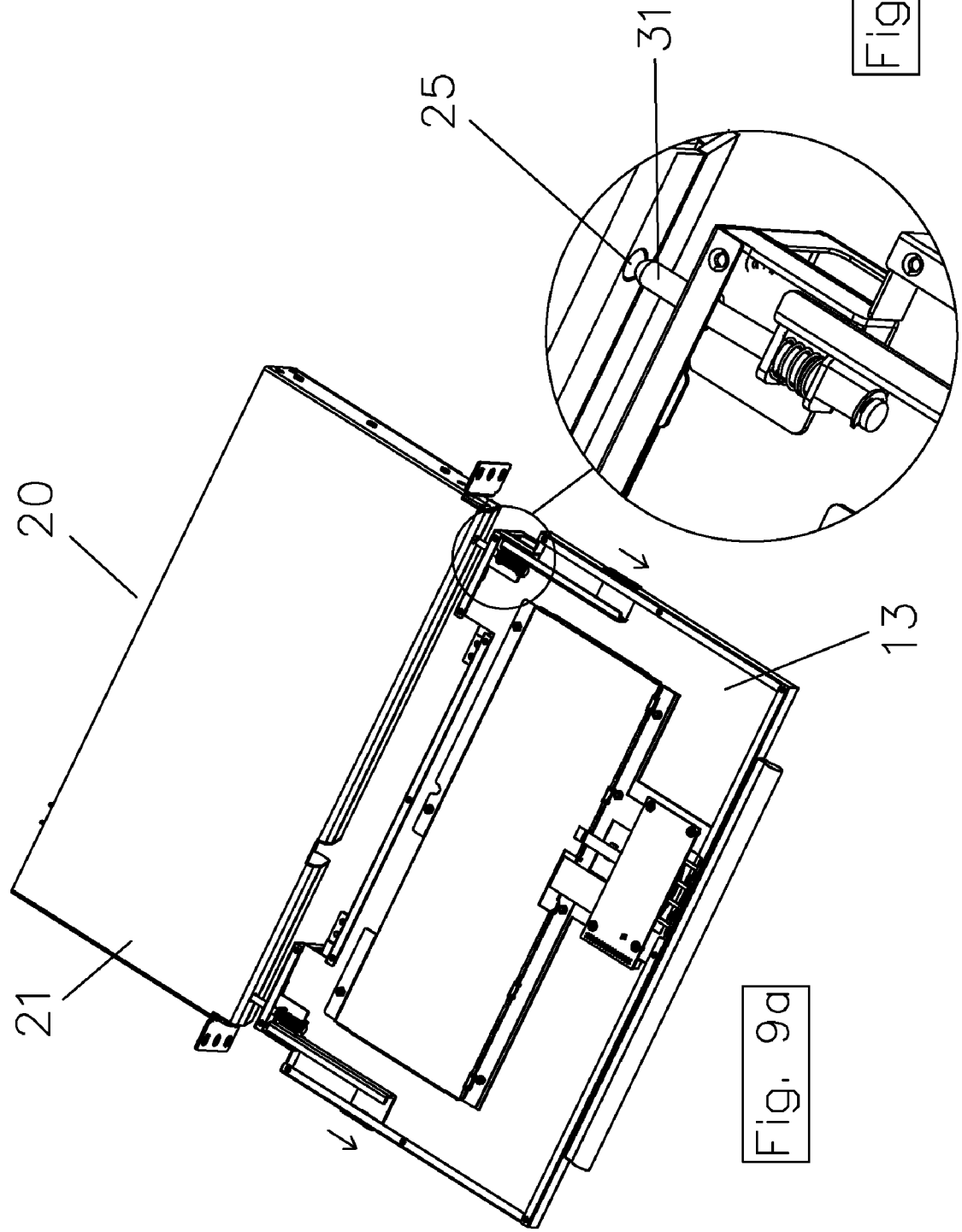

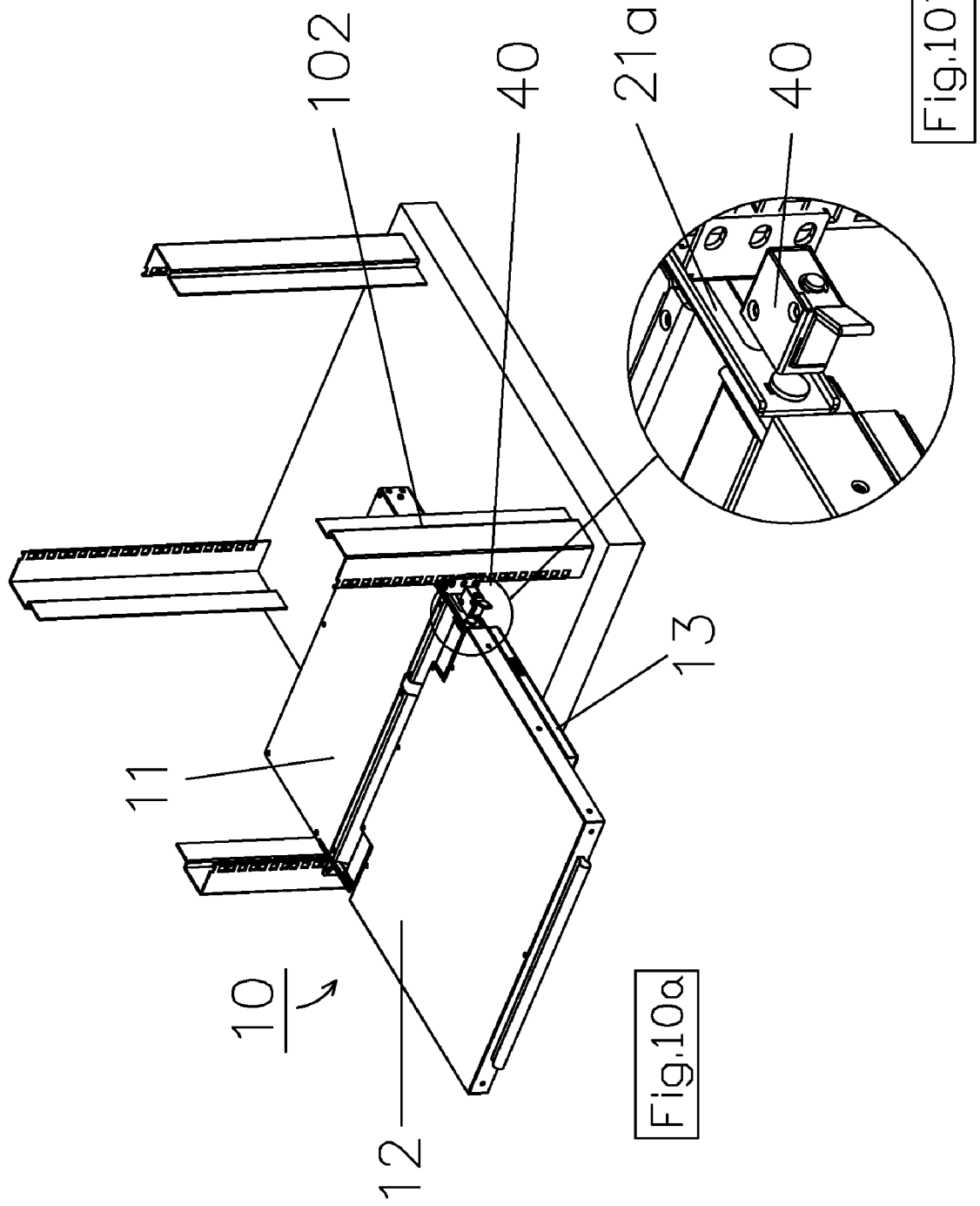

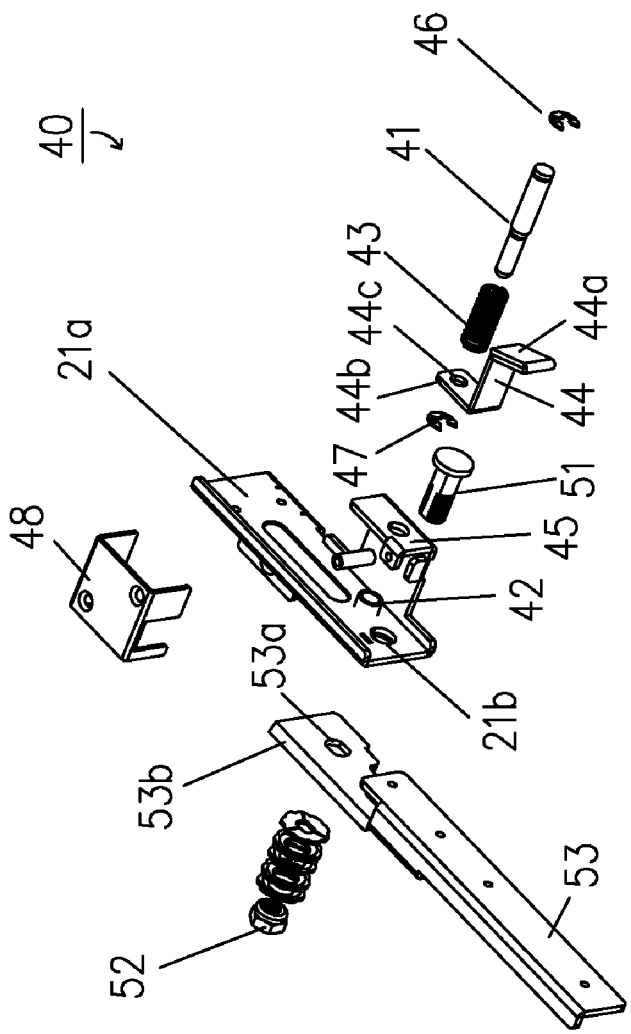
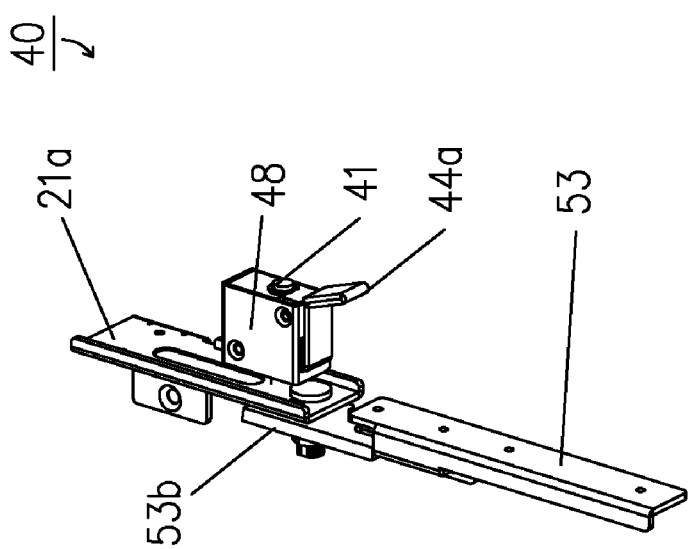

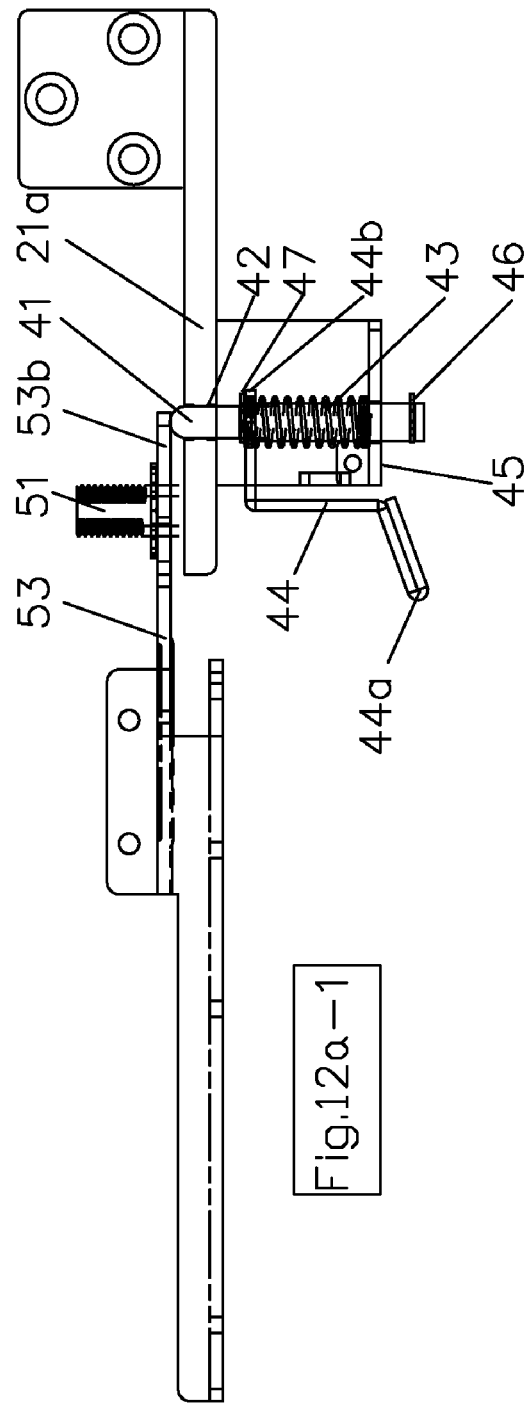
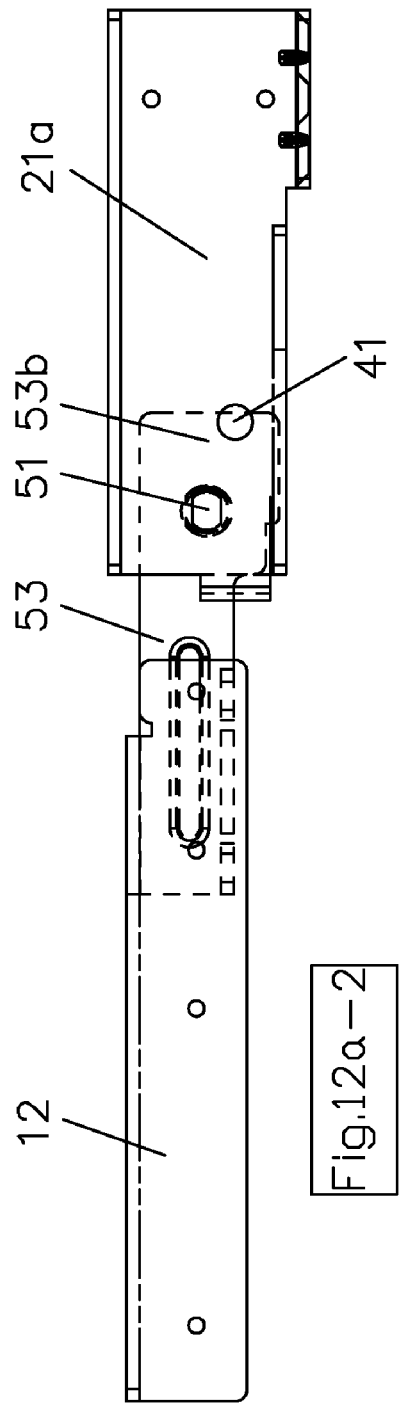
Fig.12a-1
Fig.12a-2

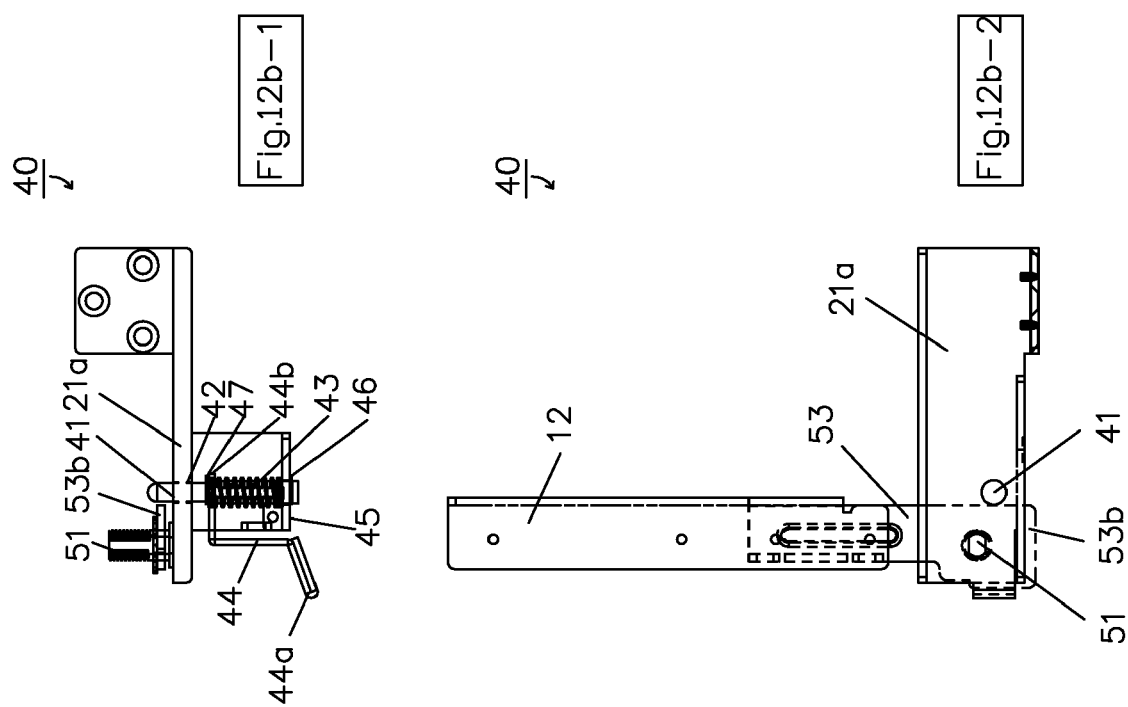

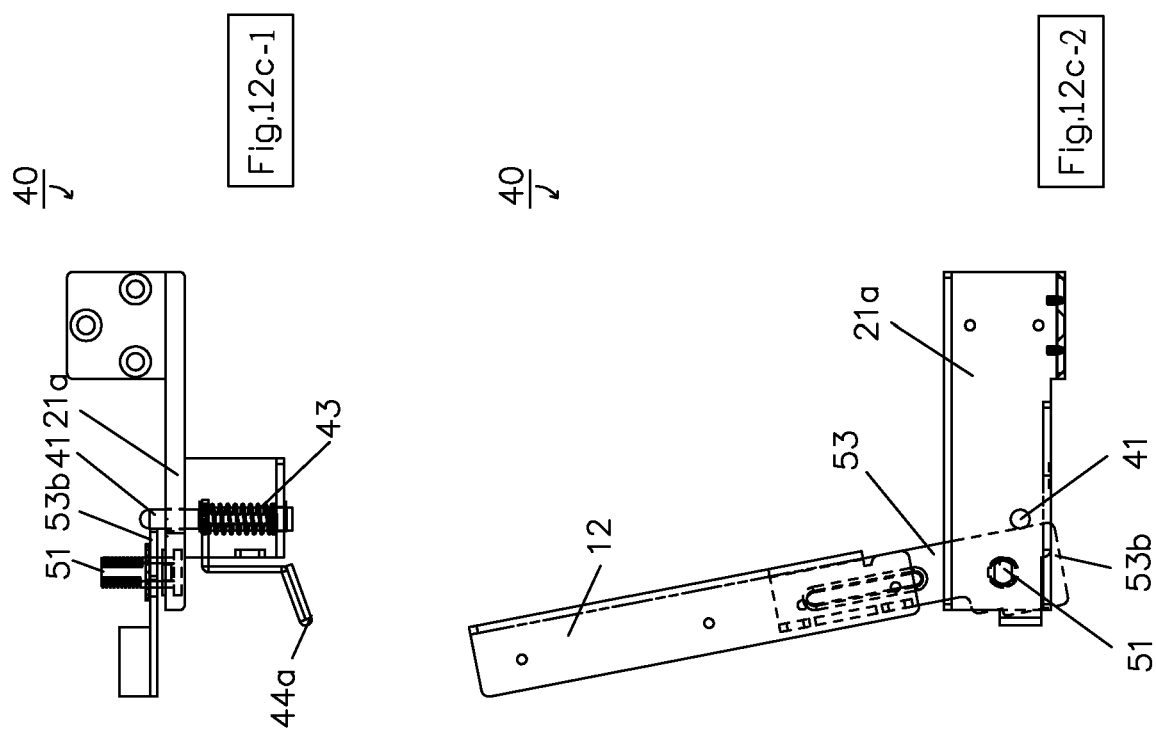

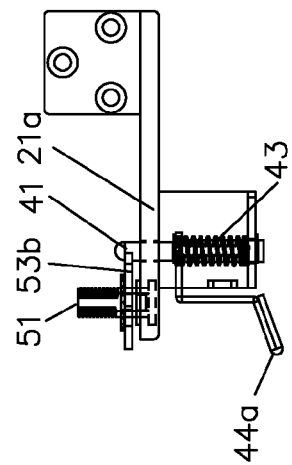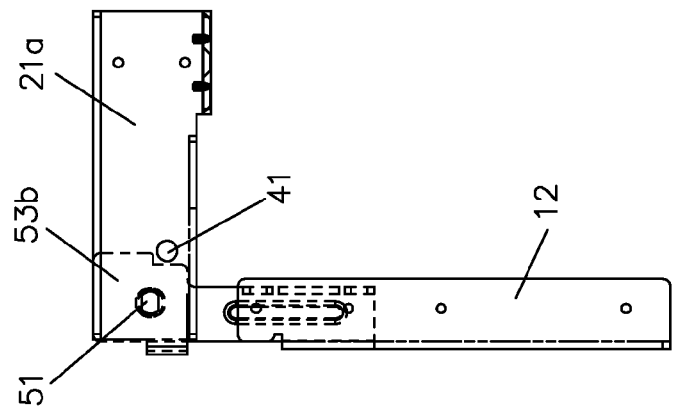

RACK-MOUNTED FOLDABLE COMPUTER CONSOLE FOR KVM SWITCH

BACKGROUND OF THE INVENTION

1. Field of the Invention

This invention relates to a Keyboard-Video-Mouse (KVM) switch, and in particular it relates to rack-mounting a combined KVM switch with a monitor, a keyboard, and a pointing device.

2. Description of the Related Art

Many computers capable of performing general purpose and specialized tasks require a computer room with raised flooring and air conditioning. Because such computer room space is quite expensive, more of such computers can be accommodated in the room if mounted in a rack. Having a separate video display, character input device, and pointing device for each computer is impractical and wastes valuable computer room space. Keyboard-Video-Mouse (KVM) switches allow a single console (or a few), each including a video display, a character input device such as a keyboard, and a pointing device such as a mouse to communicate with a plurality of computers. Behrens et al. (U.S. Pat. No. 6,609,034) describes a KVM switch fully integrated with a console, eliminating the separate storage of, and the separate access to, the KVM switch and attached console. Behrens et al. also describes mounting the integrated KVM switch with console on a rack by means of a pair of sliding rails attached to the rack. A user slides the console on the rails out of the back of the rack from a storage position to an open position extending out of the rack, and slides it back in for storage.

SUMMARY OF THE INVENTION

The present invention is directed to a rack-mounted KVM switch with console that substantially obviates one or more of the problems due to limitations and disadvantages of the related art.

An object of the present invention is to provide a rack-mounting structure for a KVM switch with console that is easy and convenient to use, easy to assemble and reduces manufacturing cost.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a combined keyboard-video-mouse (KVM) switch and console device adapted for rack mounting, which includes: a KVM switch module adapted to be fixedly mounted on one or more posts of a rack; a monitor for displaying video signals; and an input module for generating input signals, wherein a first one of the monitor and the input module is pivotally attached to the KVM switch module, wherein a second one of the monitor and the input module is pivotally attached to either the KVM switch module or to the first one of the monitor and the input module, and wherein the monitor and the input modules are electrically connected to the KVM switch module. In one embodiment, the monitor is pivotally attached to the KVM switch module by a first set of one or more hinges and the input module is pivotally attached to the monitor by a second set of one or more hinges. Optionally, a first locking mechanism releaseably locks the input module to a horizontal position, and a second locking mechanism releaseably locks the monitor to a vertical position.

In another aspect, the present invention provides a console device for a keyboard-video-mouse (KVM) switch adapted for rack mounting, which includes: a base adapted to be fixedly mounted on one or more posts of a rack; a monitor for displaying video signals; and an input module for generating input signals, wherein a first one of the monitor and the input module is pivotally attached to the base, wherein a second one of the monitor and the input module is pivotally attached to either the base or to the first one of the monitor and the input module, and wherein the monitor and the input modules are electrically connected to the base. In one embodiment, the monitor is pivotally attached to the base by a first set of one or more hinges and the input module is pivotally attached to the monitor by a second set of one or more hinges. Optionally, a first locking mechanism releaseably locks the input module to a horizontal position, and a second locking mechanism releaseably locks the monitor to a vertical position.

In yet another aspect, the present invention provides a keyboard-video-mouse (KVM) switch device, which includes: a KVM switch module; and a console pivotally and electrically connected to the KVM switch module, wherein the console includes a monitor and an input module, wherein the monitor and the input module are both pivotable with respect to the KVM switch module.

It is to be understood that both the foregoing general description and the following detailed description are exemplary and explanatory and are intended to provide further explanation of the invention as claimed.

BRIEF DESCRIPTION OF THE DRAWINGS

FIGS. 1a and 1b illustrate a combined KVM switch with console according to an embodiment of the present invention, mounted on a rack in a first configuration.

FIGS. 2a through 6b illustrate the combined KVM switch with console mounted on the rack in a second through a sixth configuration, respectively.

FIG. 7 is an exploded view of the combined KVM switch with console and its attachment to a rack, according to an embodiment of the present invention.

FIGS. 8a and 8b are perspective views of the input module in a locked position with respect to the KVM module.

FIGS. 9a and 9b are perspective views of the input module in an unlocked position.

FIGS. 10a and 10b are perspective views showing a second locking mechanism of the console.

FIG. 11a is an assembled view and FIG. 11b is an exploded view of the second locking mechanism.

FIGS. 12a-1 to 12d-2 illustrate the state of the second locking mechanism when the monitor is in various positions.

DETAILED DESCRIPTION OF THE PREFERRED EMBODIMENTS

As required, detailed illustrative embodiments of the present invention are disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Embodiments of the present invention are described with reference to the attached drawings.

FIGS. 1a through 6b illustrate a combined KVM switch with console according to one embodiment of the present invention, mounted on a rack in six of the many possible configurations. FIGS. 1a and 1b show a portion of a rack including a shelf 101, two front posts 102, and (optionally) two rear posts 103. Fixedly mounted by attachment to the front posts 102 is a KVM module 11 comprising a Keyboard-Video-Mouse switch ("KVM switch") 20 and its base 21 (see FIG. 7). A video display 12 ("monitor") is pivotally attached to the KVM module 11 by hinges and located slightly outside the rack. An input module 13, including a character input device (keyboard) and a pointing device for generating input signals, is pivotally attached to the monitor 12 by hinges. The monitor 12 and the input module 13 may be electronically connected in ways similar those of the corresponding components of a notebook or laptop computer. The KVM module 11, monitor 12, and input module 13 are physically and electronically joined together by structures more fully described later, forming the combined KVM switch with console 10 (also referred to as the console 10 for convenience). The console 10 is a compact, single, integrated unit.

At the rear of the KVM module 11 inside the rack are connectors 16 (see FIG. 7) for the console 10 to connect to computer(s) by cables (not shown), so that a human user can control and monitor such computer(s) through the console 10.

In the first configuration, as shown in FIGS. 1a and 1b, the console 10 is rack-mounted with the input module 13 and monitor 12 parallel to the horizontal plane, the monitor 12 being on top of the input module 13. The input module 13 locks to the rack in this position (described in more detail later). In this configuration the console 10 could be left closed during periods when it was not being used yet the rack's door (if any) remained open. Also, in this configuration the rack space above and below the console 10 could be fully accessed. In one embodiment, the console 10 including input module 13 and monitor 12 is foldable (i.e. pivotable) with respect to KVM module 11.

FIGS. 2a and 2b show the console 10 rack-mounted with the input module 13 still locked in the horizontal plane and the monitor 12 swiveled up vertically, until it becomes substantially perpendicular to the input module 13. In this second configuration the open console 10 could be fully used by a user standing in front of it. The user may lift the monitor 12 from its position shown in FIGS. 1a and 1b upwardly to the vertical position shown in FIGS. 2a and 2b.

In FIGS. 3a and 3b, the monitor 12 is vertical and the input module 13 is also vertical but extending below the monitor 12. From the configuration in FIGS. 2a and 2b, to get the console 10 to the configuration in FIGS. 3a and 3b, the input module 13 is unlocked and swivels down on hinges, until it becomes substantially vertical. In this third configuration, the door of the rack can be closed while a window on the door permits the monitor 12 to be viewed. Of course, the monitor 12 can be viewed when the door is open. The user may press the input module 13 from its position shown in FIGS. 2a and 2b downwardly to the vertical position shown in FIGS. 3a and 3b.

From the configuration in FIGS. 3a and 3b, to get the console 10 to the configuration in FIGS. 4a and 4b, the monitor 12 swivels down on hinges until it is in the horizontal plane, just as it was in FIGS. 1a and 1b. In this fourth configuration the rack space above the console 10 could be fully accessed. The user may press the monitor 12 from its position shown in FIGS. 3a and 3b downwardly to the horizontal position shown in FIGS. 4a and 4b.

In FIGS. 5a and 5b, both the monitor 12 and the input module 13 are vertical and extend below the KVM module 11. From the configuration in FIGS. 4a and 4b, to get the console 10 to the configuration in FIGS. 5a and 5b, the monitor 12 swivels down on hinges until it is in the vertical plane, facing the input module 13. In this fifth configuration the rack space above the console 10 could be fully accessed. Also, in this configuration the console 10 could be left closed when it was not being used, whether or not the rack's door (if any) is closed. The user may press the monitor 12 from its position in FIGS. 4a and 4b downwardly to the vertical position shown in FIGS. 5a and 5b.

In FIGS. 6a and 6b, both the monitor 12 and the input module 13 are vertical and extend above the KVM module 11. From the configuration in FIGS. 2a and 2b, to get the console 10 to the configuration in FIGS. 6a and 6b, the input module 13 is unlocked and swivels up on hinges, until it becomes vertical and faces the monitor 12. In this sixth configuration the rack space below the console 10 could be fully accessed. Also, in this configuration the console 10 could be left closed when it was not being used, whether or not the rack's door (if any) is closed. The user may press the console 10 from its position shown in FIGS. 5a and 5b upwardly to the vertical position shown in FIGS. 6a and 6b. The arrangement of the console 10 may be adjusted for operations between FIGS. 1a-6b.

FIG. 7 is an exploded view of the combined KVM switch with console 10 and its attachment to the rack. As shown in FIG. 7, a base 21 is affixed to the rack at the front posts 102. The KVM switch 20 is a separate unit joined on the rack side of the base 21 both physically and electrically. Having the base 21 as a separate component allows exchange of a replacement KVM switch 20 without removing the base 21 from the rack. Alternatively, the base 21 and KVM switch 20 can be permanently joined as one unit and mounted on the front posts 102. In either event, the housing for KVM module 11 including the base 21 and KVM switch 20 has its own cover 22. The monitor 12 has a separate cover 23 and is attached to the base 21 by two hinge assemblies 30. The input module 13 is attached to the monitor 12 by two hinges 24, each with a hinge cover 18. Alternatively, the input module 13 could be attached to the monitor 12 by one hinge. When the monitor 12 is juxtaposed with the input module 13, the two may be temporarily locked to each other, for example, by the attraction of the metal of the monitor 12 to two magnets 17 located on either side of the input module's top toward the front. In one embodiment, the console 10 including the input module 13 and the monitor 12 may be connected to the base 21 via a hinge mechanism.

The monitor 12 is electrically connected to the base 21 and/or KVM switch 20 by short and/or flexible cables. The input module 13 is electrically connected to the monitor 20 by conductors and/or flexible cables inside the hinges 24, so that electrical signals are transmitted between the base 21/KVM switch 20 and the input module 13 via the monitor 12.

As shown in FIGS. 7-9b, the locking of the input module 13 to the KVM module 11 is controlled with two release assemblies 19, one on each side of the input module 13, extending toward the base 21. Alternatively, the lock could be controlled by one release assembly. FIGS. 8a and 8b show the locked, horizontal position for the input module 13. The input module 13 is locked to the KVM module 11 by pins 31 on the input module 13 going into holes 25 on the base 21. Two of such pins 31 penetrating two of such holes 25 are sufficient to cause the desired lock. Each pin 31 is attached to the distal end of a release assembly 19. Each pin 31 and attached release assembly 13 is urged by a spring 29 toward the hole 25, the pin 31 extending through a hole 25 in the input module 13. The release assemblies 19 are disposed inside the input module 13 and extend toward the front of the input module 13. A knob 26 is formed at the proximate end of each release assembly 19 and exposed to the outside of the input module 13 to allow the user to pull the release assembly 19 to unlock the input module 13. The pins 31, holes 25, the springs 29, and the release assembly 19 constitutes a first locking mechanism for locking the positions of the console 10.

When both release assemblies 19 are pulled toward the user using the knobs 26, the springs 29 can be retracted sufficiently to remove the pins 31 from the holes 25. FIGS. 9a and 9b show the unlocked state for the input module 13, where the pin 31 is pulled out of the hole 25 on the KVM module 11. When unlocked, the input module 10 may then be moved up (as in FIGS. 6a & 6b) or down (FIGS. 5a & 5b), to become vertical. The horizontal position of the input module 13 shown in FIGS. 8a-9b may correspond to the position of the input module 13 shown in FIGS. 1a-2b.

FIGS. 10a to 12d-2 illustrate a second locking mechanism 40 for the console 10 that locks the position of the monitor 12 with respect to the base 21 or the posts 102. The second locking mechanism 40 is optionally provided in addition to the first locking mechanism. The first locking mechanism locks the input module 13 to the base 21 at a horizontal position; the second locking mechanism 40 locks the monitor 12 to the base 21 at approximately vertical angles. If the second locking mechanism 40 is not provided, the monitor 12 can be maintained at a desired angle with respect to the input module 13 by the friction in the hinges that join the monitor 12 and the input module 13. Providing the second locking mechanism 40 can help lock the position of the monitor 12 even when the input module 13 is being rotated.

As shown in FIG. 10a, the second locking mechanism 40 is located on the side of the console 10 near where the monitor 12 is joined to the base 21. FIG. 10b is a magnified view of relevant parts of FIG. 10a. While one second locking mechanism 40 is shown being located on one side of the console 10, another second locking mechanism located on the other side of the console 10 may be provided. FIG. 11a is an assembled view, and FIG. 11b is an exploded view of the second locking mechanism as well as parts of the base 21 and the monitor 12. As shown in FIG. 11b, the hinge base 21a is a part of the base 21 or connected to the base 21, which in turn is affixed to the front post 102 (see FIG. 10a). The hinge support 53 is affixed to the monitor 12. A bolt 51 that acts as the hinge axis passes through a hole 21b on the hinge base 21a and a hole 53a on the hinge support 53 connected to the monitor 12. A nut 52 secures the bolt 51 in place. The monitor 12 can pivot around this hinge axis with respect to the base 21. A lock pin 41 passes though another hole 42 on the hinge base 21a and extends out of the hinge base 21a. A Z-shaped control plate 44 (a release member) has a handle 44a and a control part 44b with a hole 44c through which the lock pin 41 passes. A spring 43 is disposed around the lock pin 41 and between the control portion 44b and a L-shaped retaining portion 45 which is a part of the hinge base 21a. A retaining ring 46 is provided around the lock pin 41 near the end, and another retaining ring 47 is provided around the lock pin 41 and located between the control portion 44b and the hinge base 21a. As shown in FIGS. 12a-1 and 12b-1, the control portion 44b, the spring 43 and the retaining ring 47, which are disposed between the hinge base 21a and the L-shaped retaining portion 45, cooperate to urge the lock pin 41 to extend more fully out of the hole 42 when the handle 44a is released (i.e. not pulled), and to pull the lock pin 41 backwards so that it retracts slightly when the handle 44a is pulled. A cover 48 covers the lock pin 41, the spring 43 and portions of the control plate 44.

FIG. 12a-1 is a top view and FIG. 12a-2 is a side view showing the second locking mechanism 40 when the monitor 12 is in a horizontal position. FIG. 12b-1 is a top view and FIG. 12b-2 is a side view showing the second locking mechanism 40 when the monitor 12 is in a raised vertical position. As shown in these figures, an end portion 53b of the hinge support 53 adjacent the lock pin 41 is shaped such that it interferes with the lock pin 41 when the monitor 12 is in the horizontal position and does not interfere with the lock pin 41 when the monitor 12 is in the vertical position. Thus, as shown in FIGS. 12b-1 and 12b-2, when the monitor 12 is in a vertical position, and when the lock pin 41 is urged by the spring 43 to fully extend out, the monitor 12 cannot change from its vertical position to a horizontal position due to the interference of the lock pin 41 and the end portion 53b of the hinge support 53. As shown in FIGS. 12c-1 and 12c-2, the monitor 12 may be able to rotate slightly from the raised vertical position. In FIGS. 12c-1 and 12c-2, the angle between the monitor 12 and the input module 13 ranges from approximately 95 to approximately 105 degrees. To rotate the monitor 12 from the vertical position to a more horizontal position, a user pulls the handle 44a of the control plate 44 to cause the lock pin 41 to retract slightly to clear the interference between the lock pin 41 and the end portion 53b (see FIGS. 12a-1 and 12a-2 showing the monitor 12 in the horizontal position).

When the monitor 12 is at a position where it is not locked by the second locking mechanism 40, the monitor 12 can be maintained at a desired angle by the friction in the hinges that join the monitor 12 and the input module 13.

From the horizontal position, the monitor 12 can continue to rotate downwards to a dropped vertical position (see FIGS. 12d-1 and 12d-2). At this position, the lock pin 41 does not interfere with the end portion 53b of the hinge support 53. The lock pin 41 is fully extended, locking the monitor 12 in the dropped vertical position. From this position, the handle 44a may be pulled to clear the interference so that the monitor 12 can be rotates to a more horizontal position.

While the structure of the second locking mechanism 40 is described in considerable detail, the second locking mechanism may be implemented by other suitable structures, so long as it can lock the monitor near the raised vertical position and/or dropped vertical position. More generally, the second locking mechanism has a lock member that interferes with the rotation of the monitor to lock the monitor at desired positions, and a release member that clears the interference to permit the monitor to rotate.

Compared to the sliding method of rack mounting a console integrated with KVM switch as taught by U.S. Pat. No. 6,609,034, the mounting structure according to embodiments of the present invention eliminates the need for sliding rails, reducing the cost as well as the risk of malfunction of the KVM switch and the console due to the sliding motion. The mounting structure is easier to assemble, and also provides more flexible configurations of the monitor and the input module. In particular, it allows the monitor to be in a viewable position even when the rack door is closed.

In the illustrated embodiment, the monitor 12 is pivotally attached to the base 21 and the input module 13 is pivotally attached to the monitor. Alternatively, the input module 13 may be pivotally attached to the base 21 and the monitor 12 may be pivotally attached to the input module 13. As another alternative, the monitor 12 and the input module 13 are each pivotally attached to the base independently.

In the illustrated embodiment the monitor 12 is electrically connected to the base 21 and/or KVM switch 20 directly and the input module 13 is electrically connected to the monitor 13. Alternatively, the input module 13 may be electrically connected to the base 21 and/or KVM switch 20 directly and the monitor 12 may be electrically connected to the input module 13. As another alternative, both the monitor 12 and the input module 13 may be electrically connected to the base 21/KVM switch 20 independently.

In addition, although the illustrated embodiments show a rack-mounted integral device that includes both the KVM switch and the console (the monitor and the input module), the invention may also be a rack-mounted console alone, without the KVM switch. In this case the console has a base that is mounted on the rack, and the KVM switch may be located near or at a distance from the console.

Moreover, although the embodiments are illustrated in an environment where the KVM switch and the console are rack mounted, the invention also covers integrated KVM switch and console that are not rack mounted. The KVM switch disclosed in the embodiments of the invention may be referred to as "foldable rack-mounted KVM" or "foldable LCD KVM".

It will be apparent to those skilled in the art that various modification and variations can be made in the apparatus of the present invention without departing from the spirit or scope of the invention. Thus, it is intended that the present invention cover modifications and variations that come within the scope of the appended claims and their equivalents.

What is claimed is:

1. A combined keyboard-video-mouse (KVM) switch and console device adapted for rack mounting, comprising:
    a KVM switch module adapted to be fixedly mounted on one or more posts of a rack;
    a base having at least one hole and adapted to be fixedly mounted on the one or more posts of the rack;
    a monitor for displaying video signals; and
    an input module for generating input signals, the input module having at least one pin;
    wherein at least one or both of the monitor and the input module are pivotally attached directly to the KVM switch module, the monitor and the input modules are electrically connected to the KVM switch module, and the input module is locked to the KVM switch module by the at least one pin on the input module going into the at least one hole on the base.

2. The device of claim 1, wherein the KVM switch module comprises:
    a KVM switch housed in and electrically connected to the base, wherein the KVM switch is detachable from the base.

3. The device of claim 1, wherein the monitor is pivotally attached to the KVM switch module by a first set of one or more hinges and the input module is pivotally attached to the monitor by a second set of one or more hinges.

4. The device of claim 1, wherein the input module includes a character input device and a pointing device.

5. The device of claim 1, further comprising a first locking mechanism for locking a position of the input module with respect to the KVM switch module.

6. The device of claim 5, wherein the first locking mechanism locks the input module in a horizontal position.

7. The device of claim 5, wherein the first locking mechanism includes a release assembly for releasing the first locking mechanism to permit the input module to rotate from a locked position.

8. The device of claim 5, further comprising a second locking mechanism for locking a position of the monitor with respect to the KVM switch module.

9. The device of claim 8, wherein the second locking mechanism locks the monitor in a vertical position.

10. The device of claim 8, wherein the second locking mechanism includes a release member for releasing the second locking mechanism to permit the monitor to rotate from a locked position.

11. A console device for a keyboard-video-mouse (KVM) switch adapted for rack mounting, comprising:
    a base having at least one hole and adapted to be fixedly mounted on one or more posts of a rack for housing and electrically connecting with the KVM switch;
    a monitor for displaying video signals; and
    an input module for generating input signals, the input module having at least one pin;
    wherein at least one or both of the monitor and the input module are pivotally attached directly to the base, the monitor and the input modules are electrically connected to the base, and the input module is locked to the base by the at least one pin on the input module going into the at least one hole on the base, wherein the at least one pin is urged by a spring toward the at least one hole, whereas the input module can be unlocked from the base when the spring is retracted sufficiently to remove the at least one pin from the at least one hole.

12. The device of claim 11, wherein the monitor is pivotally attached to the base by a first set of one or more hinges and the input module is pivotally attached to the monitor by a second set of one or more hinges.

13. The device of claim 11, wherein the input module includes a character input device and a pointing device.

14. The device of claim 11, further comprising a first locking mechanism for locking the input module in a horizontal position, the first locking mechanism including a release assembly for releasing the first locking mechanism to permit the input module to rotate from a locked position.

15. The device of claim 14, further comprising a second locking mechanism for locking the monitor in a vertical position, the second locking mechanism including a release member for releasing the second locking mechanism to permit the monitor to rotate from a locked position.

16. A keyboard-video-mouse (KVM) switch device adapted for rack mounting, comprising:
    a KVM switch module; and
    a console pivotally attached directly to the KVM switch and electrically connected to the KVM switch module, wherein the console includes a monitor and an input module, wherein the monitor and the input module are both independently pivotable with respect to the KVM switch module and the monitor rotates within a range of angles when the input module in a horizontal or vertical position.

17. The KVM switch device of claim 16, wherein the monitor is pivotable with respect to the input device.

18. The KVM switch device of claim 16, wherein the monitor is pivotally connected to the KVM module, and the input module is pivotally connected to the monitor.

19. The KVM switch device of claim 16, wherein the input module is pivotally connected to the KVM module, and the monitor is pivotally connected to the input module.

20. A combined keyboard-video-mouse (KVM) switch and console device adapted for rack mounting, comprising:
    a KVM switch module adapted to be fixedly mounted on one or more posts of a rack;
    a monitor for displaying video signals;

an input module for generating input signals; and
at least one pin affixed to the KVM switch module to lock the input module to the KVM switch module,
wherein at least one or both of the monitor and the input module are pivotally attached directly to the KVM switch module, the monitor and the input modules are electrically connected to the KVM switch module.

* * * * *